J. F. FISHER.
Machine for Distributing Fertilizers.

No. 84,870.

Patented Dec. 15, 1868.

Witnesses
M. A. Cooke
C. F. Noun

Inventor:
John F. Fisher
by
D. Brew Atty.

United States Patent Office.

JOHN F. FISHER, OF GREENCASTLE, PENNSYLVANIA, ASSIGNOR TO HIMSELF AND DANIEL BREED, OF WASHINGTON, DISTRICT OF COLUMBIA.

Letters Patent No. 84,870, dated December 15, 1868.

IMPROVEMENT IN MACHINE FOR DISTRIBUTING FERTILIZERS.

The Schedule referred to in these Letters Patent and making part of the same.

*To all whom it may concern:*

Be it known that I, JOHN F. FISHER, of Greencastle, in the State of Pennsylvania, have invented a new and useful Improvement in Sowers for Fertilizers; and I do hereby declare that the following is a full, clear, and exact description of the same, reference being had to the accompanying drawings, and letters of reference marked thereon, making a part of this specification, in which—

Figure 1:
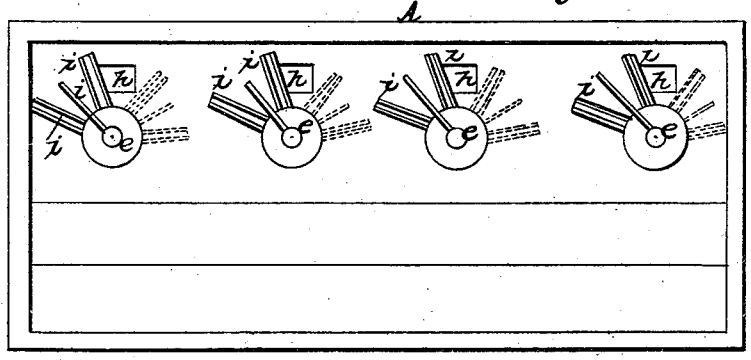
Figure 1 is a plan view of my invention, showing the feeding-fingers.
Figure 2:
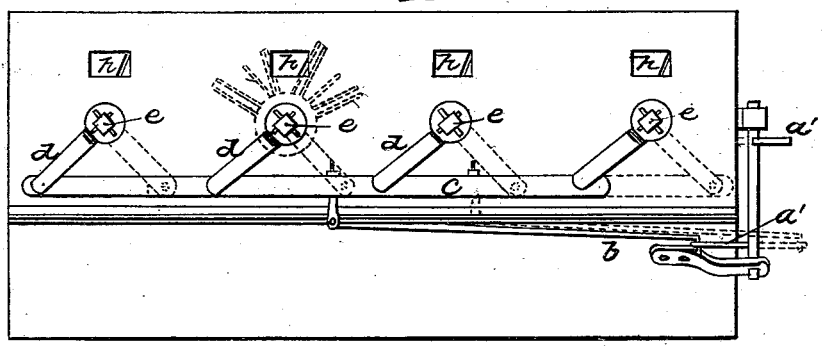
Figure 2 is a plan view of my invention inverted, showing the operating-cranks.

This invention consists of a mechanism for imparting motion to certain feeding-fingers placed directly over orifices in the bottom of a box containing any of the common prepared fertilizers, for the purpose of sowing the same, in the manner of sowing grain, as will hereinafter more fully appear.

To enable those skilled in the art to make and use my invention, I now proceed to describe its construction and operation.

Similar letters in the drawings refer to like parts.

A represents a box, of the kind commonly used for containing fertilizing-material.

Upon one end of the same is secured transversely a shaft, $a$, provided with arms $a'$ $a''$, projecting at right angles with the axis of said shaft, the arm $a$ being connected by any suitable means with the driving-wheels of the carriage, supporting the sowing-mechanism, so as to derive a vibratory motion therefrom.

The other arm, $a''$, projecting from the shaft $a$ in a plane, nearly at right angles with the plane of the arm $a'$, is joined at its outer end to one extremity of a rod, $b$, the other extremity of which is connected with a bar, $c$, of wood, or other suitable material.

The said bar $c$ may be termed a coupling-bar, as it connects the outer ends of four or more arms, $d\ d\ d\ d$, projecting from the lower extremities of the shafts $e\ e\ e\ e$, which pass through cast-iron boxes in the bottom of the box A, and up into said box, far enough to afford surface for the attachment of the feeding-fingers $i$ in the inside of the said box.

The connection between the arms $d$ and the shafts $e$ should be such that the former may be easily removed from the latter.

The arms $d$ are parallel, or nearly so, with the bottom of the box A, and sufficient space should be left between them and such bottom to afford room for the free play of the coupling-bar $c$.

The number of feeding-fingers $i$ attached to each upright shaft $e$, is three, of which two move nearly in contact with the bottom of the box A, and are of the shape of a trapezium in cross-section, the lower side of each being wider than the upper side, so as to make the two lateral sides inclined, and the two lower edges sharp, for the purpose of preventing any of the fertilizing-material from being drawn under the fingers during their vibration, and thus impeding the operations of the machine.

The third finger of each shaft $e$ should be attached above the other two, parallel with them horizontally, and between them vertically, for the purpose of keeping the fertilizing-material in the vicinity of the orifices $h$ sufficiently stirred up to prevent the same from forming an arch over and around the fingers, and thus ceasing to flow.

It will be seen that the vibratory motion derived by the arm $a'$ from the motor, is communicated, by means of the shaft $a$, arm $a''$, connecting-rod $b$, coupling-bar $c$, and arms $d$, to the shafts $e$ and the fingers $i$, so that the latter play to and fro over the orifice $h$, and produce a constant flow of the fertilizers through the same.

I am aware that a series of spiked rollers has been set perpendicularly in the hopper, and worked backward and forward through a partial revolution, by means of cranks above the hopper; therefore I confine myself to working beneath the hopper, as above described.

Having thus fully described my invention,

What I claim as new, and desire to secure by Letters Patent, is—

1. The combination of the coupling-bar $c$, arms $d$, working beneath the hopper, and shafts $e$, substantially as and for the purposes described.

2. The combination of the above with the fingers $i$, as and for the purpose set forth.

3. The fingers $i$, when so arranged that their acute angles are presented to the floor of the hopper, for the purpose specified.

JOHN F. FISHER.

Witnesses:
GEO. E. BROWN,
JNO. D. PATTEN.